July 6, 1926.

P. E. HAWKINSON 1,591,816

PROCESS OF REPAIRING PNEUMATIC TIRE CASINGS

Filed August 15, 1924    8 Sheets-Sheet 2

Inventor
Paul E. Hawkinson
By his Attorneys
Merchant and Regan

July 6, 1926.

P. E. HAWKINSON

PROCESS OF REPAIRING PNEUMATIC TIRE CASINGS

Filed August 15, 1924    8 Sheets-Sheet 4

Inventor
Paul E. Hawkinson
By his Attorneys
Merchant and Kegan

July 6, 1926.

P. E. HAWKINSON

PROCESS OF REPAIRING PNEUMATIC TIRE CASINGS

Filed August 15, 1924    8 Sheets-Sheet 8

Inventor
Paul E. Hawkinson
By his Attorneys
Merchant and Nelson

Patented July 6, 1926.

1,591,816

UNITED STATES PATENT OFFICE.

PAUL E. HAWKINSON, OF MINNEAPOLIS, MINNESOTA, ASSIGNOR TO KE HAWKE MFG. CO., OF MINNEAPOLIS, MINNESOTA, A CORPORATION OF MINNESOTA.

PROCESS OF REPAIRING PNEUMATIC-TIRE CASINGS.

Application filed August 15, 1924. Serial No. 732,326.

My present invention provides an improved process of repairing pneumatic tire casings, or, in other words, a repair system which includes an improved patch without corners, disclosed and claimed in my Letters Patent of the United States No. 1,436,394 of date November 21, 1921, and certain other important features disclosed and broadly claimed in a co-pending application executed of even date herewith and entitled "Improved patch and process of making the same and an improved process of repairing pneumatic tire casings". Said invention is also a continuation of certain features disclosed and broadly claimed in my Letters Patent of the United States #1,505,141 of date August 19, 1924 and entitled "Combined tire casing turner and work support".

It may be here stated that in carrying out the improved process, the work thereof is greatly facilitated by the use of my "tire casing holder and spreader", described and broadly claimed in my two United States Letters Patents of date September 14, 1920, and No. 1,352,601 and 1,352,807, whereby a tire casing may be held in normal position or the sides thereof spread and the tire casing rotated around a horizontal axis, and by the use of my combined tire casing turner and work support above referred to, whereby a section of the tire casing to be repaired may be turned inside out and supported.

The primary objects of my improved repair system are: (1) to do all the work from the inside of a tire casing, except to fill up the actual hole or cut in the tread thereof; (2) to make all repairs in a tire casing, irrespective of the size or location of the injury, with multiple ply patches without corners, preferably round, in which the plies are welded together, and having long beveled edge portions in which the ends of the threads or cords are likewise beveled. Said patches being disclosed and broadly claimed in my United States Letters Patent No. 1,436,394 above referred to and said co-pending application executed of even date herewith; (3) in determining the number of plies in a casing to be repaired and selecting a patch of the desired size to extend outward of the injury in all directions and having a number of plies equal to one-half of the total number of plies in the casing; (4) in providing patch patterns to be used in pairs, one of which has the same contour as the periphery of the selected patch, and the other of which has the same contour as the inner edge of the beveled edge portion of said patch, said patterns being provided with central apertures to assist in centering the same over an injury to be repaired; (5) in using the patterns when a casing is in normal position, and marking therearound on the inner ply of the casing to indicate a cutting line and a skiving line; (6) in cutting and removing from the area indicated by the cutting line, when the casing is spread and turned inside out, a number of the inner plies of said casing to form an opening for the selected patch, the number of inner plies removed being preferably one-half the total number in the casing being repaired and of the same number as the selected patch; (7) in skiving the edge portions of the inner plies in the casing surrounding the opening to form a long bevel extending from the skiving line to the periphery of the patch, when the casing is spread and turned inside out, and at which bevel the ends of the threads or cords are likewise beveled. The beveled edge portions of the patch and inner plies of the casing are reversely formed so that when the patch is placed in the opening prepared therefor its beveled edge portion will overlap the beveled edge portion of said inner plies and form a perfect bevel joint; (8) in placing the selected patch in the opening formed in the casing therefor, when said casing is in normal position, between the opposing surfaces of which is rubber cement and a sheet of cushion gum; (9) in turning the patch in the opening to align the threads or cords in its several plies with the threads or cords in the respective plies of the casing and to bring their beveled ends into overlapping engagement to form splices; (10) and in vulcanizing the repair which solidly welds the body of the patch to the casing. the beveled edge portion of the patch to the beveled edge portion of the inner plies of the casing, and the beveled ends of the threads or cords in the patch with the respective beveled ends of the threads or cords in said inner plies.

The improved process also has other important objects, certain of which are the buffing of the inner ply of the casing where the repair is to be made, the buffing of the exposed ply in the bottom of the opening formed for the patch, in removing progressively smaller portions of the remaining plies of the casing, with the exception of the outermost, and beveling the edge portions thereof to form a relatively small opening, and at which beveled edge portion the threads or cords therein are likewise beveled, in forming single ply patches with beveled edge portions formed by skiving, and at which beveled edge portions the ends of the threads or cords therein are likewise beveled. The beveled edge portions of the single ply patches and the beveled edge portions of the respective plies are reversely formed so that when the patches are placed in the opening prepared therefor the beveled edge portions will overlap the beveled edge portions of said plies and form bevel joints. In placing the single ply patches in said relatively small opening with their beveled edge portions overlapping the beveled edge portions of the respective plies of the casing and with their threads or cords extending in the same direction as the threads or cords in said respective plies and with the beveled ends of their threads or cords overlapping the beveled ends of the threads or cords with which they are aligned in the respective plies, to form splices, and to which patches and casing have been applied rubber cement, and in welding the single ply patches in position, their beveled edges to the beveled edges of the respective plies, and the beveled ends of their threads or cords to the beveled ends of the threads or cords in the respective plies, in trimming the outer ply of the casing around the injury and placing a layer of cushion gum therein, in placing a thin layer of cushion gum in the actual hole in the tread and in filling said hole with tread stock.

My improved process of repairing tire casings from the inside does not in any way deface the exterior of a casing nor disturb the breakers, cushions, or outside plies, which is highly important as it does not effect the casing wherein its greatest strength lies, and is also important from an economic standpoint, and furthermore by applying a patch to the inside of a casing an inflated tube therein will greatly assist in holding the patch in place.

The improved patches, heretofore referred to, are numbered and are now carried in stock in various different sizes and a number of plies, so that when a repair is to be made, a complete patch of the desired size and number of plies may be selected. These patches are preferably made from good parts of used casings which, aside from an economic standpoint, are preferable to patches made from new material for the reason that the material in used tire casings is not only of a high class, but has all of the stretch taken out of the same and are perfectly shaped to fit the contour of the casing, which is of the utmost importance in that when a patch is welded in position, it will stay exactly where it is put and not stretch and bulge, and furthermore, the plies of such a patch are solidly welded together.

In making these patches, a number of welded plies are removed from a used casing and then buffed to remove the rubber therefrom. Multiple ply patches are then cut from the good parts of said welded plies which are of a number desired for the patches. The edges of the several plies in the patches are then skived to form long beveled marginal edge portions on their convex faces, and both faces and beveled edge portions of each patch are given a coat of relatively thin rubber cement which is allowed to thoroughly dry and then given a second coat of relatively heavy rubber cement which is also allowed to thoroughly dry. Before a patch is used a sheet of cushion gum, say one sixty-fourth of an inch in thickness, is applied to the rubber cement-coated convex face thereof. Patches thus made have the same dish or curvature as the casing to which they are applied and also the threads or cords of successive plies extend transversely or at an angle to each other.

By using a patch having the same number of plies as the number of plies removed from the casing to receive the patch, the repair will be of the same thickness as the casing, without high or low spots, and the same flexibility of said casing, after repairing, will be retained. Also by making the patches from good parts of used casings, they have the same curvature as the casings to which they are to be applied and hence make perfect repair sections.

One of the primary objects of making the patches round is that they may be turned in the opening prepared therefor in the casing to be repaired to align their threads or cords with the threads or cords in the casing, and a further object of making these patches without corners is that only one point on a patch is effected by the flexible movement of a casing as it comes into contact with the ground and then as said casing revolves further, the strain travels around the continuous or curved edges of the patch so that its action on a repair is gradual without any tendency to loosen the patch. When a patch with square or sharp edges is put into a casing, each time said casing, at the patch, comes in contact with the ground and the casing goes through a flexing motion, the whole front edge of the patch receives the strain at one time, which tends to break the casing as well as the repair.

By the use of the patch patterns, which have the same shape as the patches, a given area of a casing surrounding an injury may be indicated and the desired number of plies removed to form an opening for a patch so that the patch will exactly fit therein. These patterns are so made that they can be placed over an injury and the pattern centered so that a given area of the casing may be indicated substantially equal distances in all directions from the injury.

The size of the small pattern used in indicating the cutting line on the inner ply of a casing to be repaired is determined by the size of the patch selected to make a repair and the size of the large pattern used in indicating the skiving line on said casing is determined by the number of plies in said casing. The patterns are also numbered to correspond to the numbers on the patches with which they correspond.

These patterns like the patches are carried in stock and each repair shop using my improved repair system will have a complete set as well as a supply of prepared patches of different sizes and number of plies.

The long beveled edge portion of a patch which overlaps the beveled edge portions of the inner plies of the casing when vulcanized securely splices the overlapped ends of the threads or cords and forms a repair that is as strong as the original material, without leaving said repair any thicker than the balance of the casing and at the same time making a repair that is as flexible and pliable as the main body of the casing which is of utmost importance in order to make a repair stand up. The patch and its beveled edge portions are firmly pressed onto the casing by the inflated tube in the casing which greatly assists in holding the patch in position.

The invention is illustrated in the accompanying drawings wherein like characters indicate like parts throughout the several views.

Referring to the drawings:

Fig. 23 is a view corresponding to Fig. 22 with the exception that the multitple ply patch has been put in.

Figure 1:
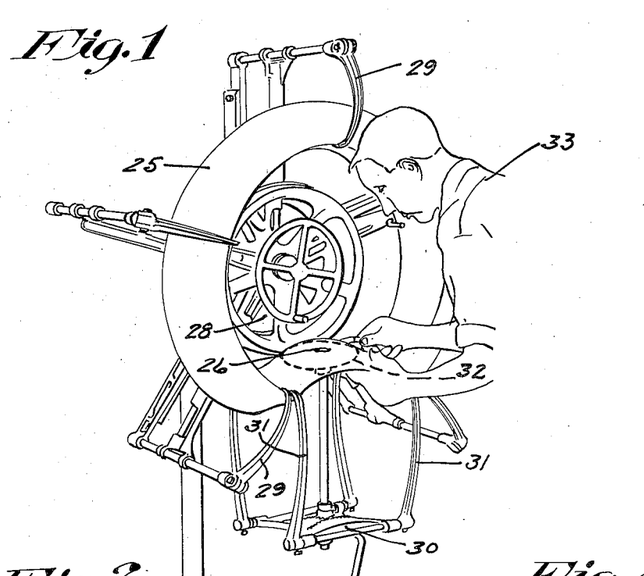
Fig. 1 is a perspective view of a tire-holding and spreading machine in which is mounted a pneumatic tire casing held spread and also showing a tire casing turner and lifter held suspended from the tire casing and holding a portion of the casing, in which there is an injury, turned inside out and supported, and further showing a workman cutting down the casing around an injury to be repaired.

The numeral 25 indicates a pneumatic cord tire casing having in its tread an injury 26 to be repaired, and which injury extends completely through all of the plies 27 thereof. This casing 25 may be assumed to have six plies and is held in one of my tire casing holding and spreading machines above referred to, and which machine is indicated as an entirety by the numeral 28 with the exception of its hook-equipped arms 29 arranged to engage the beads of a casing at a plurality of circumferentially spaced points and hold the same either in a normal position or with its sides spread as shown in Fig. 1, and with freedom to be rotated around a horizontal axis.

A section of the casing 25, at the injury 26, is held turned inside out by one of my tire casing turners and work supports indicated as an entirety by the numeral 30 with the exception of the grapple arms 31 and head 32. These grapple arms 31 are arranged to engage the beads of a casing at circumferentially spaced points with the section of the casing to be repaired therebetween and hold said device suspended from the casing. The head 32 is radially adjustable in respect to a casing and arranged to engage the tread thereof and turn the same inside out and at the same time serve as a work support. It will be noted that this head 32 is made convex and holds the injured portion of the casing 25 tightly drawn thereover and in a convenient position for the workman 33, as shown in Fig. 1.

Figure 2:
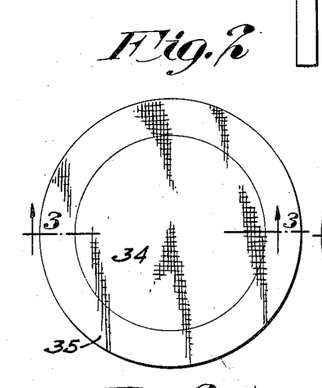
Fig. 2 is a view showing the convex side of one of the improved multiple ply patches.
Figure 3:
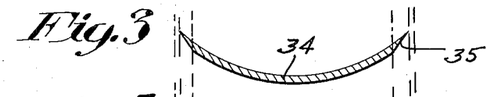
Fig. 3 is a transverse section taken on the line 3—3 of Fig. 2.

The numeral 34 indicates one of the improved round cord patches heretofore referred to, and which patch, as shown, has three plies, the under edges of which, on the convex side of the patch, are beveled at 35 to sharp edges. This patch 34 is dished to conform with the curvature of the casing 25 both transversely and circumferentially, and as previously stated, is preferably made from a good part of a used cord tire casing in which all of the stretch has been taken out. It is of course understood that the cords in successive plies in the patch 34 extend transversely of each other as in the tire casing 25.

Figure 4:
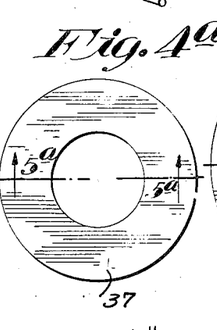
Figs. 4 and 4ª are plan views showing a pair of the patch patterns.
Figure 5:
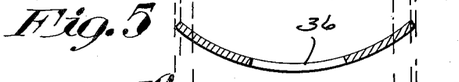
Fig. 5 is a transverse section taken on the line 5—5 of Fig. 4.

The numerals 36 and 37 indicate, respectively, a pair of round patch patterns, the former of which is relatively large, and the latter of which is relatively small, and each has at its axis a round hole affording a sight opening for use in centering the patches over the injury 26. These patterns 36 and 37 are preferably made from rubber, are relatively stiff so as to hold their forms, and are dished to correspond with the curvature of the patch 34 which they represent. The small pattern 37 has a diameter slightly greater, say one-eighth of an inch, than that of the inner edge of the bevel 35 on the patch, and the large pattern 36 has a diameter greater than, say three-fourths of an inch, that of the small pattern 37. As previously stated, the size of the small patch 37 is determined by the size of the patch 34 selected to make the repair and that the size of the large pattern 36 is determined by the number of plies in the tire casing 25.

There is further illustrated in the drawings one of my buffing wheels 38 having a flexible shaft 39 leading from the armature shaft and of an overhead travelling electric motor, not shown.

The invention includes a plurality of distinct steps or operations in repairing a casing, certain of which comprise a cutting down process and certain others of which include a building up process. The making of the patch 34 will not here be referred to as a part of the improved process for the reason that the same has been previously described and fully disclosed and broadly claimed in my U. S. Letters Patent No. 1,436,394 heretofore referred to and said application executed by me of even date herewith, and such patches are now supplied to the trade in standard sizes and of different number of plies, ready for use except to have applied to their convex faces sheets of cushion gum. In making a repair it is only necessary to select a patch of the proper size and number of plies. Likewise the patterns 36 and 37 are supplied to the trade with the patches which they represent.

The method of repairing the casing 25 will now be described in detail;

*Cutting down process.*

Step 1. Mount the casing 25 on the machine 28 and operate the same to spread its sides and then rotate the grapple arms 31 to bring the injury 26 at the lowermost portion thereof which is most convenient for the workman, as shown in Fig. 1. Then buff the inner surface of the casing 25 by means of the buffing wheel 38 throughout an area considerably largely than that to be repaired. After this buffing, remove any loose tread directly around the injury 26 on the inside of the casing 25. Then trim the tread around the injury 26 to a beveled edge and lightly buff, by means of the buffing wheel 38. It is important not to remove any more of the tread around the injury 26 than is necessary.

Figure 6:
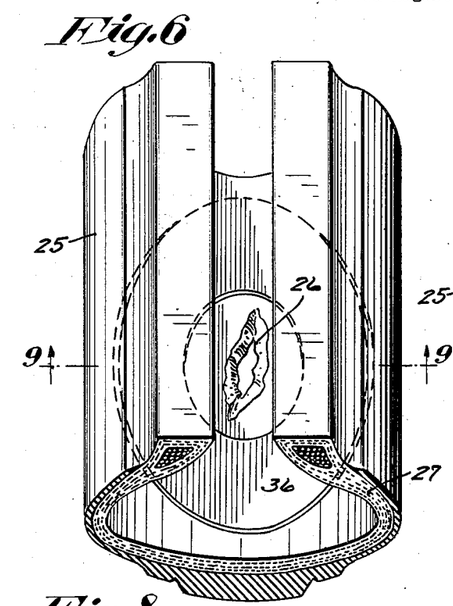
Fig. 6 is a fragmentary inner view of the casing in normal position and showing the large pattern centered over the injury.
Figure 7:
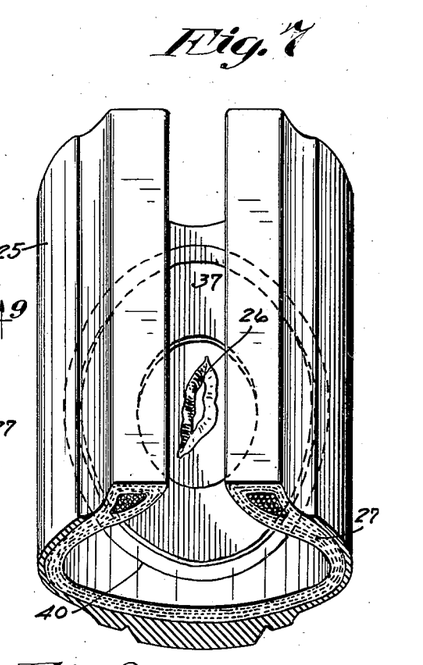
Fig. 7 is a view corresponding to Fig. 6 with the exception that the large pattern has been removed after a skiving line has been traced therearound on the inside of the casing, and also showing the small pattern concentrically located within the skiving line.
Figure 8:
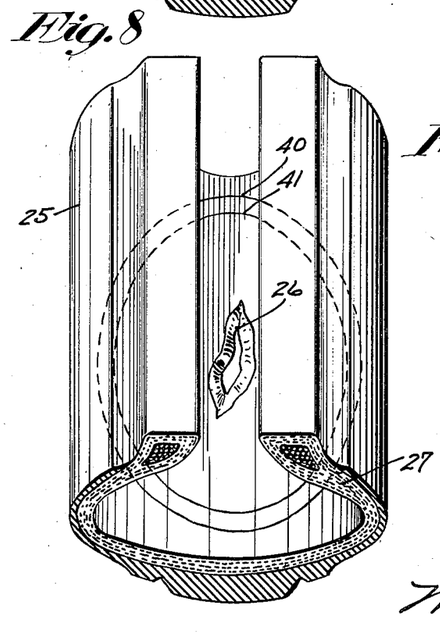
Fig. 8 is a view corresponding to Fig. 6 with the exception that the small pattern has been removed after a cutting line has been traced therearound on the inside of the casing.
Figure 9:
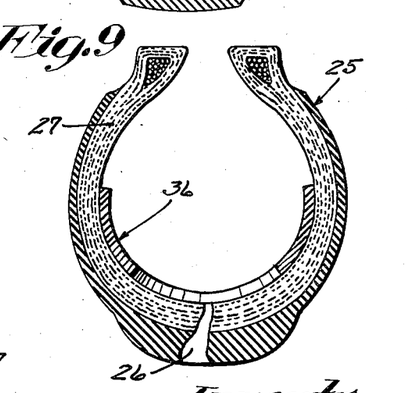
Fig. 9 is a transverse section taken on the line 9—9 of Fig. 6.

Step 2. Operate the machine 28 to release the spread sides of the casing 25 and allow said casing to return to normal position. Place the selected large pattern 36 on the inside of the casing 25 (see Figs. 6 and 9) and at the same time turn the pattern so that the curvature thereof corresponds with the curvature of the casing and then, while holding said pattern with the fingers of one hand, hold a short indelible pencil, (not shown) in the other hand and trace a skiving line 40 on the inside of the casing 25, using the periphery of the pattern as a guide and holding the sharp point of the pencil close thereto. Then remove the large pattern 36 and place the selected small pattern 37 on the inside of the casing (see Fig. 7) in the same manner that the large pattern was placed therein, concentric with the skiving line 40, and then trace a cutting line 41 around the periphery thereof in the same manner that the skiving line 40 was traced around the small pattern 37. Extreme care should be taken while tracing the lines 40 and 41 (see Fig. 8) not to spread the sides of the casing 25 sufficiently to distort the same in the vicinity of the lines 40 and 41 so that the lines will be perfectly true when the casing 25 is in normal position.

Figure 10:
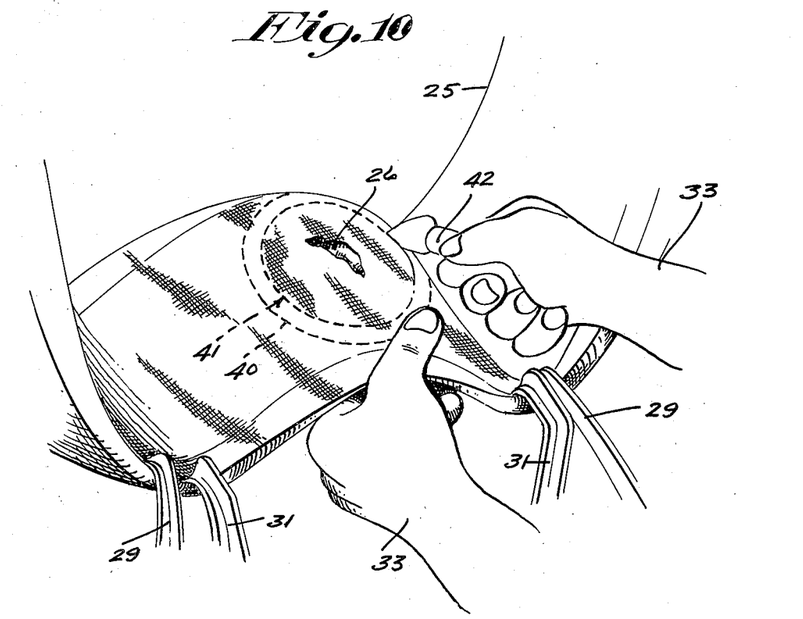
Fig. 10 is a fragmentary perspective view of the section of the casing containing the injury spread and turned inside out and also showing the hands of the workman, one of which is holding the casing and the other of which is using a knife to cut the inner plies of the tire casing just inside of the cutting line.

Now operate the machine 28 to again spread the sides of the casing 25 and hang the tire casing turner and work support 30 thereon, with its head 32 directly under the injury 26, and then operate said device so as to turn the respective or injured portion of the casing 25 inside out, as shown in Figs. 1 and 10.

Figure 11:
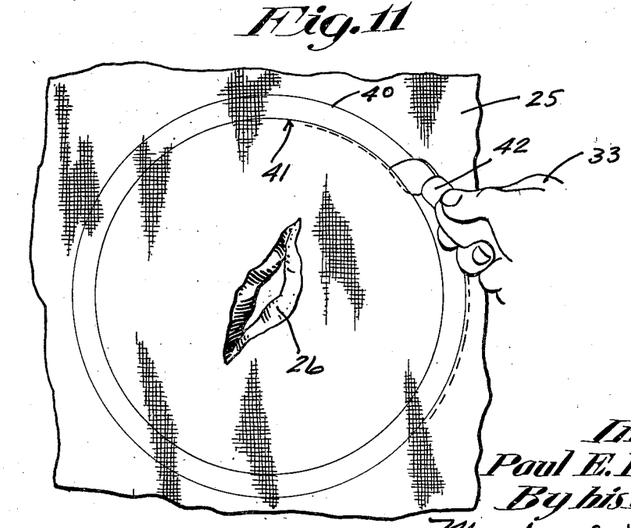
Fig. 11 is an enlarged view of the casing as shown in Fig. 10.

Step 3. Now cut, preferably with a special notched knife 42 adapted to be pushed to produce a cutting action, the inner ply of the tire casing 25 following the cutting line 41 as a guide and cutting just inside thereof, say one-sixteenth of an inch, see Figs. 10 and 11. After the first inner ply is completely cut through, cut the second ply in a like manner and then the third, which in the present instance is one-half the number of plies in the casing 25 and the proper number to be removed. A mark should be made at the beginning of the cut so that a complete cut may be made through the inner plies and no more as it is important not to cut too deep. It is highly important not to cut more than one-half the number of plies in the casing.

Figure 12:
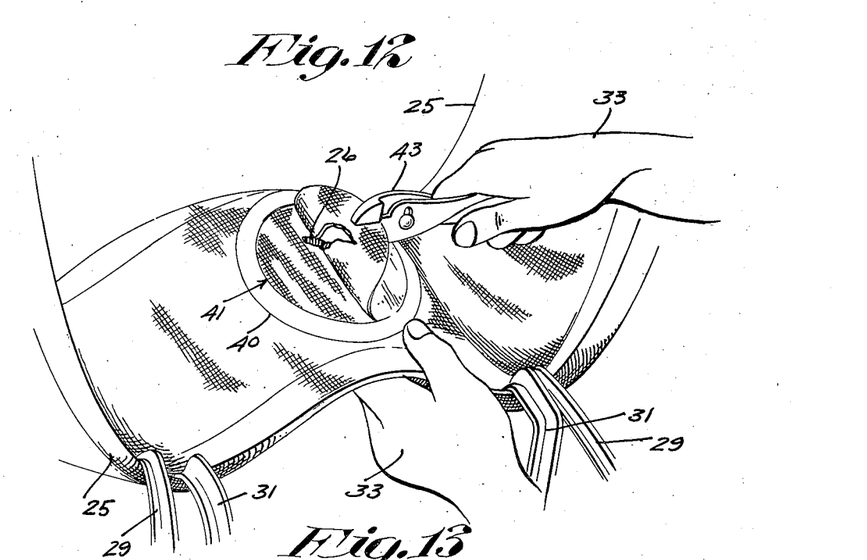
Fig. 12 is a view corresponding to Fig. 10 showing the workman removing the cut area of the inner plies of the casing by means of a pair of pliers.
Figure 13:
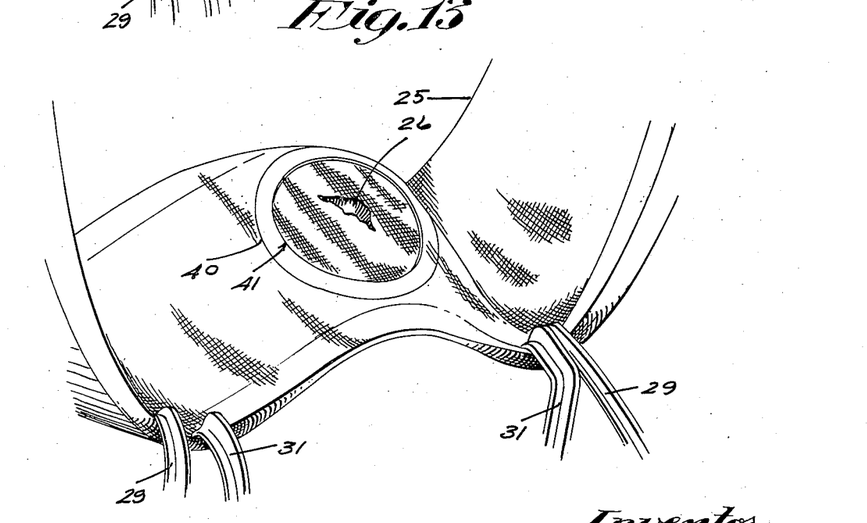
Fig. 13 is a view corresponding to Fig. 12 with the exception that the cut area of the inner plies of the casing has been removed.

Step 4. Take a screw driver or similar tool, not shown, work the same under the edge of the lowermost cut ply and then pry up the edges of all the cut plies at once. Then with a pair of pliers 43, rip out all of the cut plies at one time (see Fig. 12).

Figure 14:
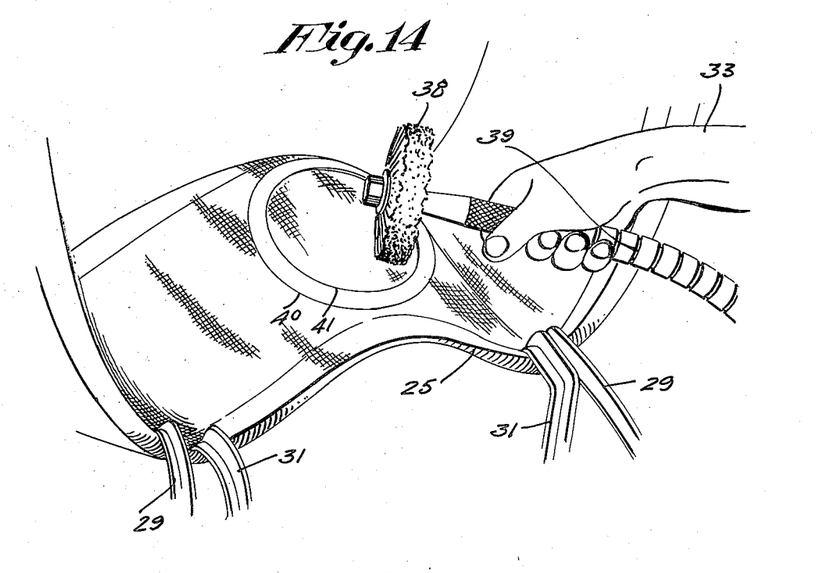
Fig. 14 is a view corresponding to Fig. 13 showing the workman buffing the exposed inner ply of the casing.

Step 5. Buff very lightly, by means of the buffing wheel 38, the entire exposed surface of the fourth ply to remove the rubber therefrom (see Fig. 14).

Figure 15:
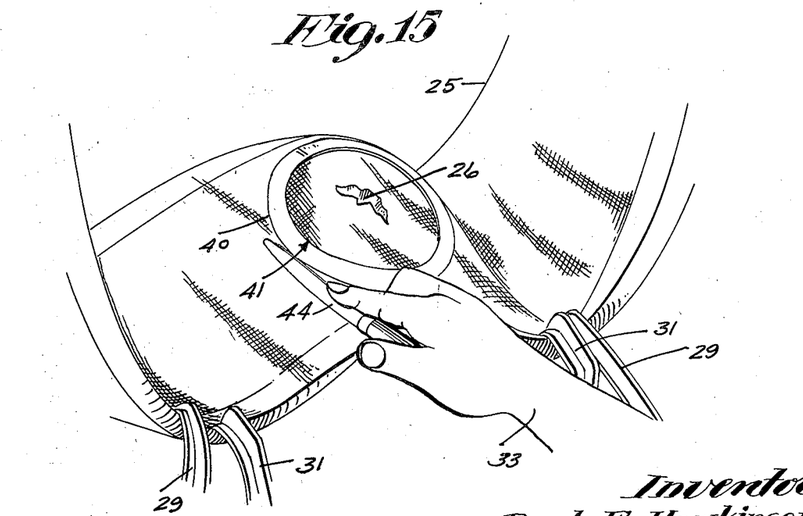
Fig. 15 is a view corresponding to Fig. 14 showing the workman skiving the edges of the cut plies and using the skiving line as a guide.

Step 6. Skive the exposed edge portions of the cut inner plies with a sharp knife 44 having a flexible blade. This skiving should be started, say one-sixteenth of an inch inside of the skiving line 40 and extends to the exposed fourth ply, thus producing a long bevel 45 with an even slope, (see Fig. 15). It may be here stated that the lines 40 and 41 will be distorted by turning the respective portion of the casing 25 inside out but by following these lines a perfect seat may be formed for the patch 34, and which seat, when the spread and turned casing 25 is released, will assume its true form.

Figure 16:
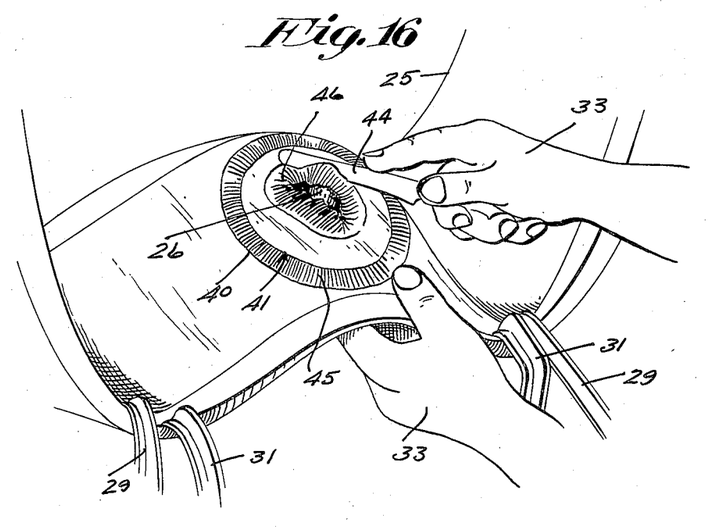
Fig. 16 is a view corresponding to Fig. 15 showing the workman skiving the edges of certain of the outer plies around the injury.
Figure 17:
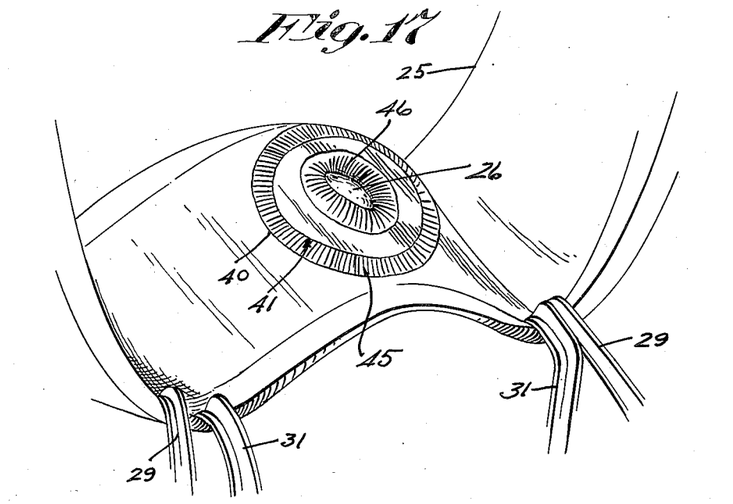
Fig. 17 is a view corresponding to Fig. 16 showing all of the skiving completed.

Step 7. Skive at 46 the edge portions of the fourth and fifth plies surrounding the injury so as to form a long gradual bevel. Preferably, this skiving 46 should be as follows: start on the fourth ply about one and one-half inches back of the injury 26 and skive all the way around. Then start on the fifth ply about one-half an inch away from said injury and skive all the way around. Then carefully trim the edge of the sixth ply surrounding the injury 26, but do not cut away any more than is necessary. This skiving 46 does not need to be done in a circle but should follow the general shape of the injury 26, (see Fig. 16).

Figure 18:
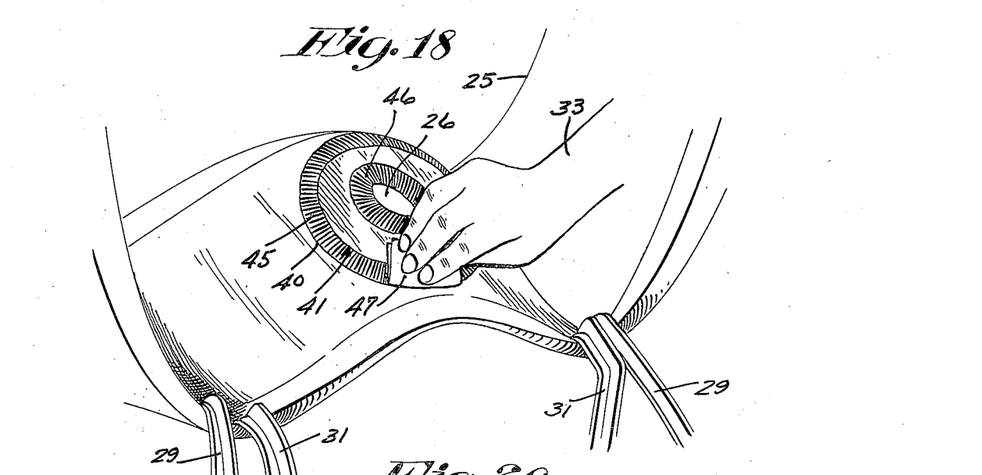
Fig. 18 is a view corresponding to Fig. 17 showing the workman using a piece of sand paper on the beveled edges of the plies.

Step 8. Use a piece of coarse sand paper 47 (see Fig. 18) and rub lightly over completed beveling 46 to roughen the glass-like surface of the rubber so that rubber cement to be applied will hold properly. It is important not to rub away the fine skived edges of the cords as they must be retained to insure an even joint between the patch 34 and the casing 25.

Step 9. Remove the tire casing turner and work support held suspended from the casing 25 and apply to the entire prepared surface surrounding the injury 26 a coat of good vulcanizing cement. This cement should be of a medium consistency so that it will penetrate into the casing proper and thereby insure a good foundation. After this coat of cement is thoroughly dry, apply a second coat of a little heavier consistency so as to leave a thin film of cement over said surface. Then remove the casing 25 from the machine 28 and allow the cement to thoroughly dry.

*Building up process.*

Figures 19, 20:
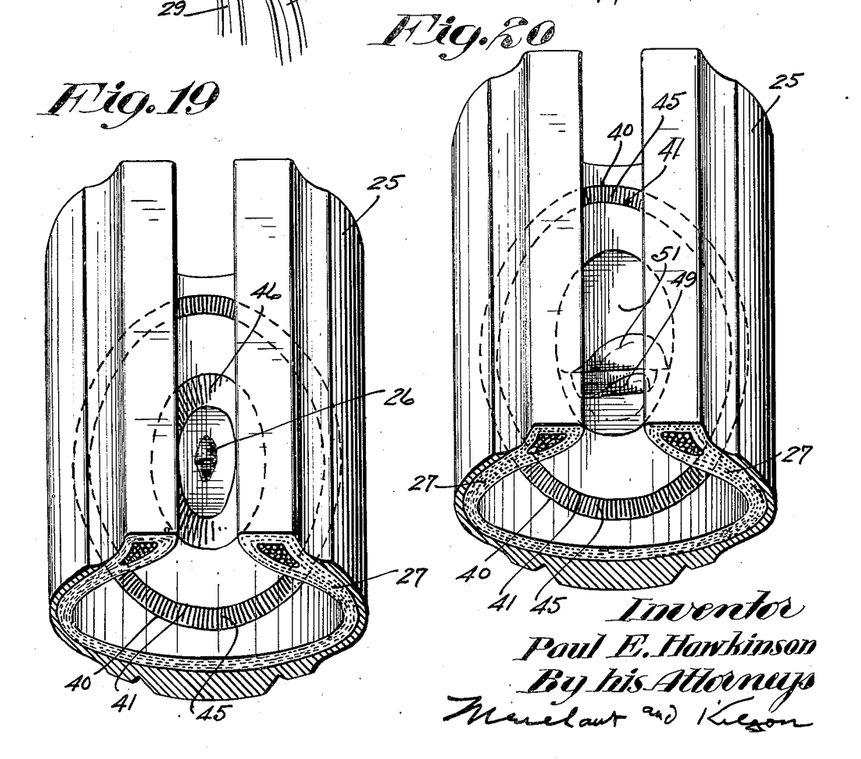
Fig. 19 is a fragmentary view of the casing in normal position at the completion of the cutting down process.
Fig. 20 is a view corresponding to Fig. 19 showing the injury in the outer plies partly repaired by means of cushion gum and single ply patches.

Step 1. Place the casing 25 in the machine 28 after the cement is thoroughly dry. (It may be here stated that it is highly important to keep the casing in a normal position throughout the entire building up process for the reason that if the opening made therein for the patch 34 is distorted, said patch will not form a perfect fit with the body of said casing.) Now place a small piece, say one sixty-fourth of an inch, of cushion gum 48 in the injury 26 in the sixth ply. Then cut a piece of new cord repair fabric of the proper size and shape to fit in the opening in the fifth ply and skive the edge portion thereof to form a bevel that will overlap the beveled edge portion of said fifth ply, to form a single ply patch 49. Cement and place this patch in the opening in the fifth ply with the cords extending in the same direction as the cords in the fifth ply, with its beveled edge portion overlapping the beveled edge portion of the fifth ply and with the beveled ends of its cords overlapping the beveled ends of the cords in said fifth ply to splice the cords in said patch and fifth ply, and then press the patch down with a roller 50. Then cut a second piece of new cord repair fabric of proper size and shape to fit in the hole in the fourth ply and skive its edge portion to a bevel that will overlap the beveled edge portion of said patch to form a single ply patch 51. Cement the patch 51 and position like the patch 49 with its cords extending in the same direction as the cords in the respective ply and with the beveled ends of said cords overlapping each other to splice the cords in said patch and ply, and press down with the roller 50. This building up of the fourth and fifth plies with pieces of new cord repair fabric is highly important in making a proper repair. If the injury in the outer plies of a casing was simply filled with gum, the result would be a gum pocket or soft spot which would allow a hinge flexibility at the center of the repair, thus leaving the repair weak at the most vital point.

Figure 21:
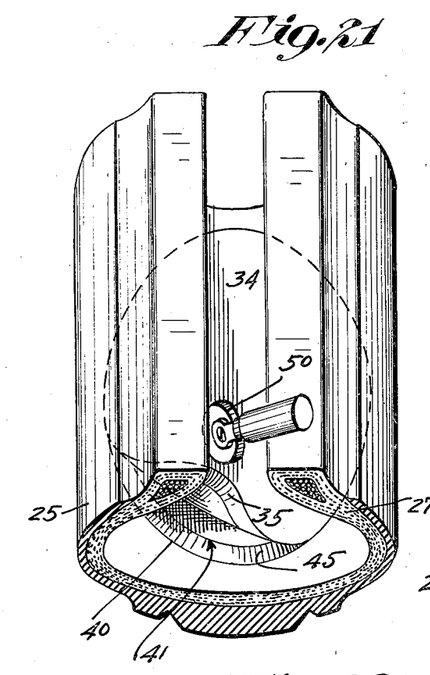
Fig. 21 is a view corresponding to Fig. 20 showing the multiple ply patch partly put into position and being pressed into place by means of a roller.
Figure 22:
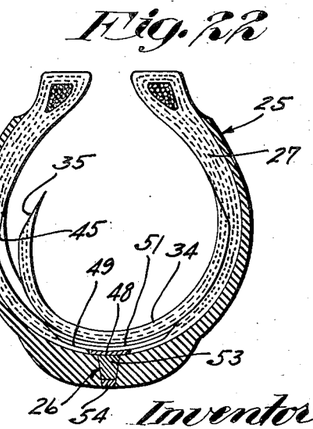
Fig. 22 is a transverse section taken substantially on the line 22—22 of Fig. 21.
Figure 23:
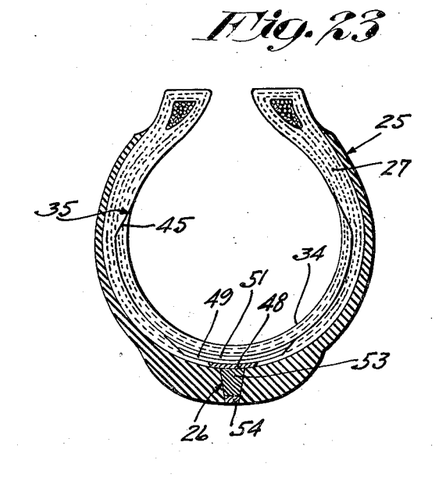

Step 2. Apply a sheet of cushion gum to the convex face of the patch 34, remove the protecting holland therefrom and place the patch in the opening made therefor in the first, second and third plies. In placing this patch in position it will be adhesively held and it is of the utmost importance to have the cords in the several plies thereof extend in the same directions as the respective plies of the body of the casing 25. It is also important that the beveled edge portions of the patch fit perfectly on the beveled edge portions of the surrounding plies of the casing 25. In skiving the edge portions of the plies in the body of the casing 25 and the edge portions of the patch 34, the ends of the cords are cut on a bevel and hence, when said patch is applied in position with the cords extending in the same direction as the cords in the casing, the beveled ends of said cords overlap each other and are spliced together during the vulcanizing process. The patch after being properly positioned is pressed down thoroughly with a roller 50, (see Fig. 21).

Figure 24:
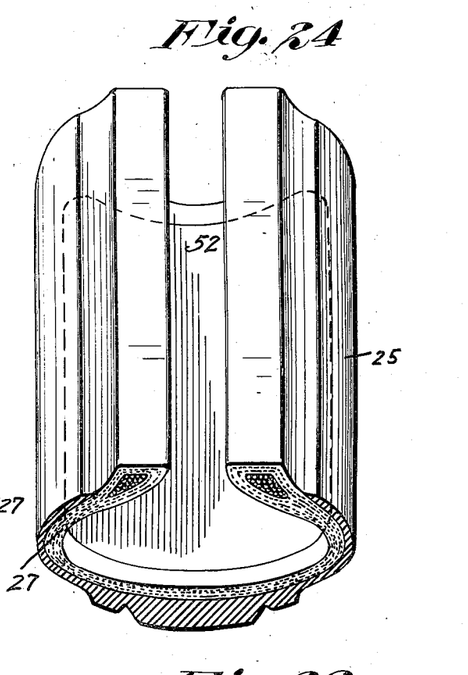
Fig. 24 is a view corresponding to Fig. 21 with the exception that a two-ply reinforcement has been applied over the multiple ply patch and surrounding portion of the inner ply of the casing.

Step 3. Cement a two-ply reinforcement 52 over the patch 34 and onto the surrounding portion of the inner ply of the casing 25 and press down thoroughly with the roller 50. The cords in the outer ply of this reinforcement should run transversely of the cords in the inner ply of the casing 25. Next, place a piece of cushion gum 53 in the hole in the tread of the casing and then fill said hole with a tread stock 54 well rolled in and trim with a knife to the general tread design of the tire casing.

This same process relates to repairing fabric casings except that the patches are made from new repair fabric instead of new cord repair fabric.

What I claim is:

1. An improved process of repairing pneumatic tire casings which consists in providing a patch to be applied to a casing, in indicating the outline of the patch on the inside of the casing without spreading its sides sufficiently to distort the normal shape of the section thereto to be repaired, in turning the respective section of the casing inside out, in cutting and removing one of the plies of the casing within the area indicated by the outline to form an opening for the patch while said section is turned inside out, in turning said section back to normal position, and in placing the patch in the opening and welding the same to the casing while said casing is in normal position.

2. An improved process of repairing pneumatic tire casings which consists in providing a multiple ply patch having a beveled marginal edge portion skived to a sharp edge, in indicating the outline of the patch on the inside of the casing without spreading its sides sufficiently to distort the normal shape of the section thereof being repaired, in turning the respective section of the casing inside out, in cutting and removing portions of the inner plies within the area indicated and of a number corresponding to the number of plies in the patch, in beveling the marginal portions thereof while said section is turned inside out, said marginal portion of said patch and inner plies being reversely beveled for overlapping engagement, and in placing the patch in the opening and welding the same to the casing while said casing is in normal position.

In testimony whereof I affix my signature.

PAUL E. HAWKINSON.